(12) United States Patent
Onikiri et al.

(10) Patent No.: US 7,875,892 B2
(45) Date of Patent: Jan. 25, 2011

(54) LIGHT-EMITTING DEVICE, LINEAR LIGHT SOURCE, PLANAR LIGHT UNIT AND DISPLAY APPARATUS

(75) Inventors: Akira Onikiri, Fujiyoshida (JP); Daisaku Okuwaki, Fujiyoshida (JP); Naoya Kashiwagi, Fujiyoshida (JP)

(73) Assignee: Citizen Electronics Co., Ltd, Fujiyoshida-shi, Yamanashi-ken (JP)

( * ) Notice: Subject to any disclaimer, the term of this patent is extended or adjusted under 35 U.S.C. 154(b) by 0 days.

(21) Appl. No.: 12/412,862

(22) Filed: Mar. 27, 2009

(65) Prior Publication Data

US 2009/0242909 A1  Oct. 1, 2009

(30) Foreign Application Priority Data

Mar. 28, 2008  (JP) .............................. 2008-088856

(51) Int. Cl.
*H01L 33/00* (2010.01)
(52) U.S. Cl. .................... 257/88; 257/98; 257/E33.068
(58) Field of Classification Search .................. 257/88, 257/98, E33.068
See application file for complete search history.

(56) References Cited

U.S. PATENT DOCUMENTS

| 7,712,943 B2* | 5/2010 | Yao et al. ..................... 362/612 |
| 2007/0109792 A1* | 5/2007 | Chosa et al. ................ 362/341 |
| 2008/0101086 A1* | 5/2008 | Lee ............................. 362/615 |

FOREIGN PATENT DOCUMENTS

| JP | 2001-236811 | 8/2001 |
| JP | 2003-215346 | 7/2003 |

* cited by examiner

*Primary Examiner*—Trung Dang
(74) *Attorney, Agent, or Firm*—Brinks Hofer Gilson & Lione

(57) ABSTRACT

A light-emitting device used in a linear array of a plurality of them includes a semiconductor light-emitting element, a substrate on which the semiconductor light-emitting element is mounted, and a light-transmitting sealing resin formed on the front surface of the substrate to seal the semiconductor light-emitting element. Of each of the peripheral edge surfaces of the substrate and the sealing resin, at least one side surface that faces in the direction of the array is inclined in the array direction.

19 Claims, 6 Drawing Sheets

[Fig. 1]
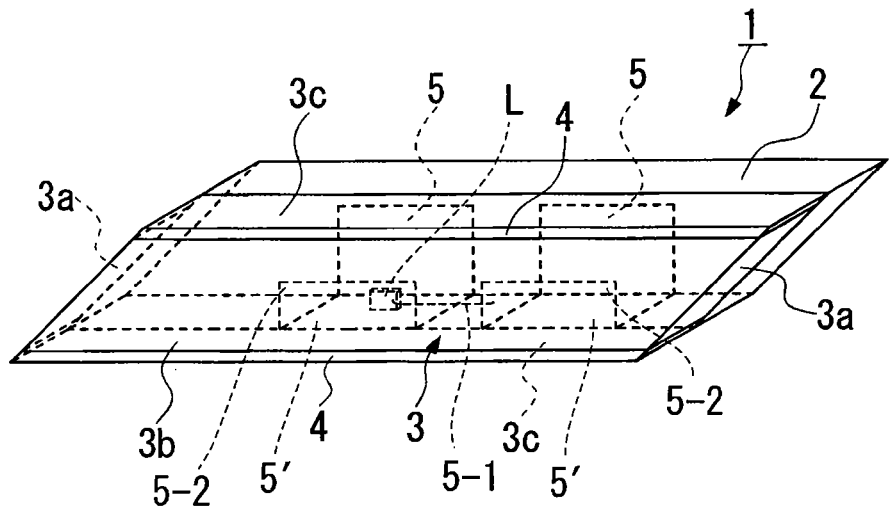
[Fig. 2]
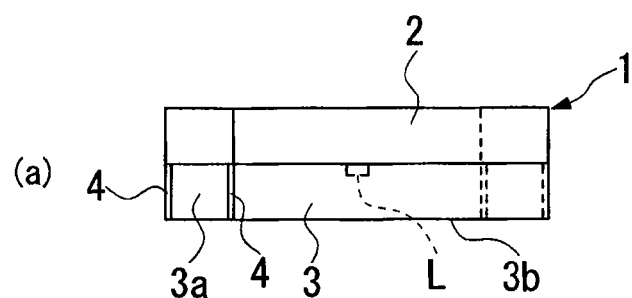
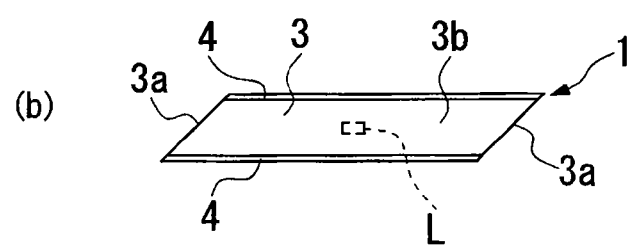
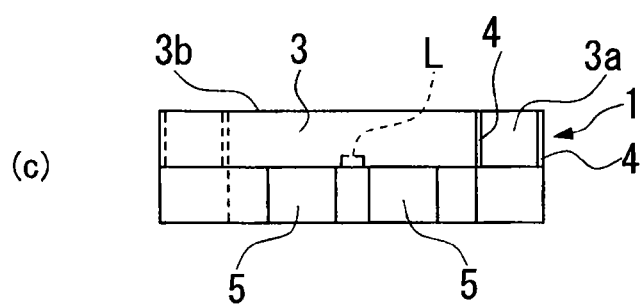

[Fig. 3]
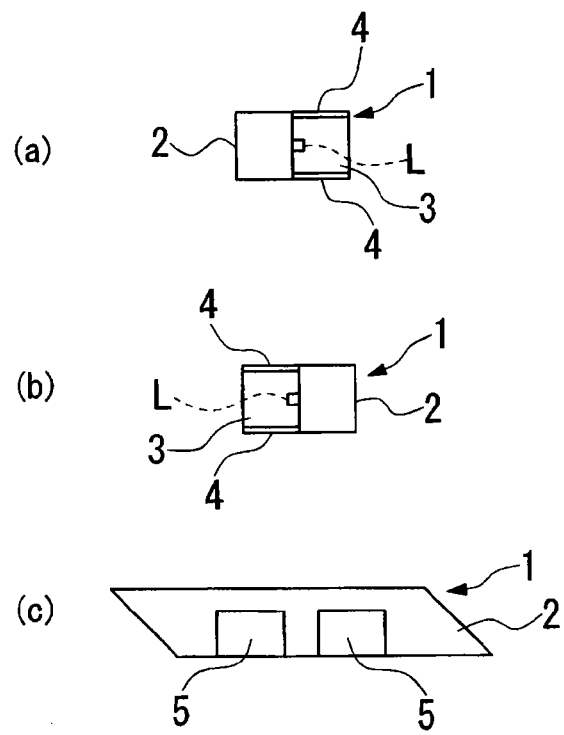
[Fig. 4]
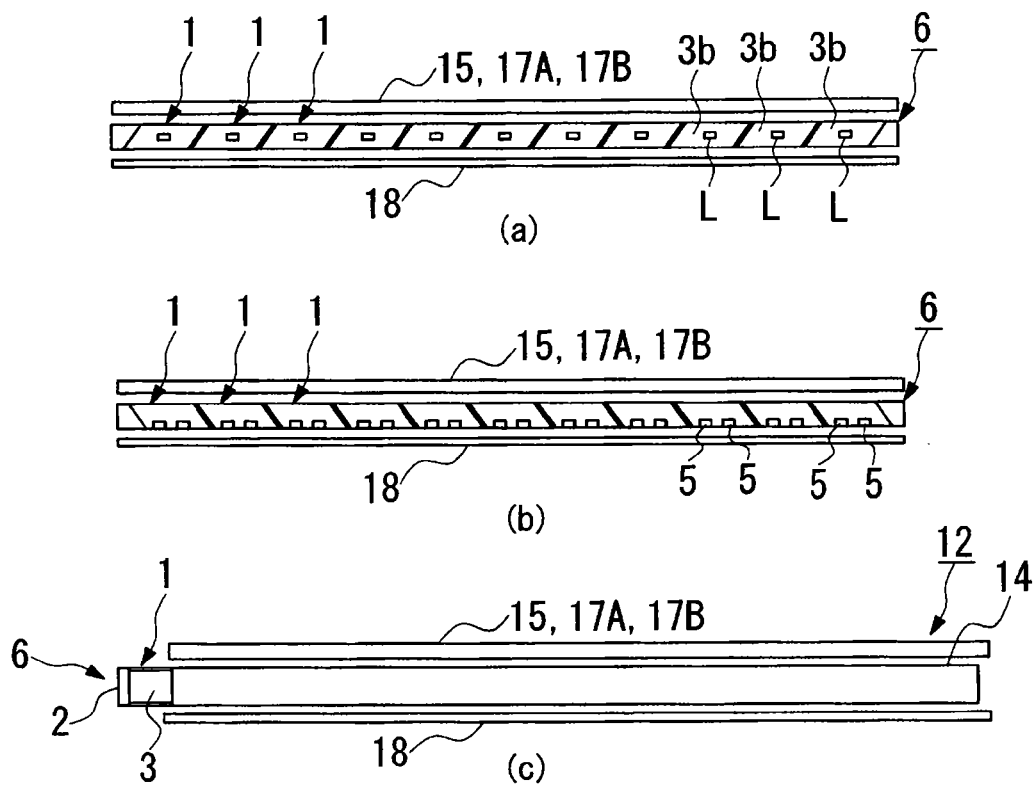

[Fig. 5]
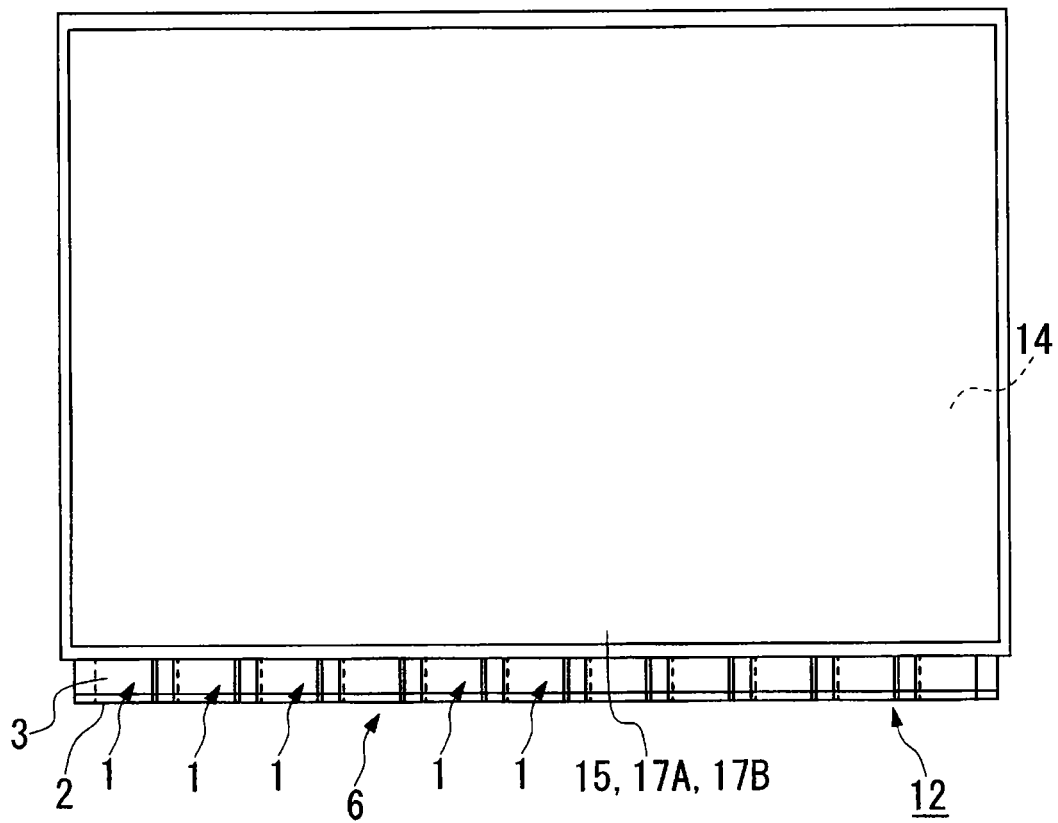
[Fig. 6]
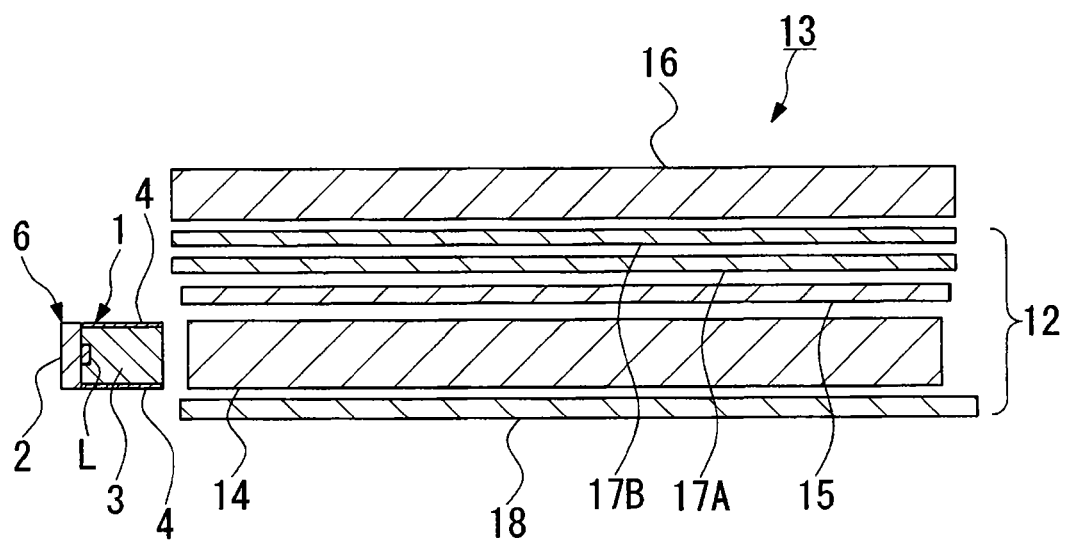

[Fig. 7]
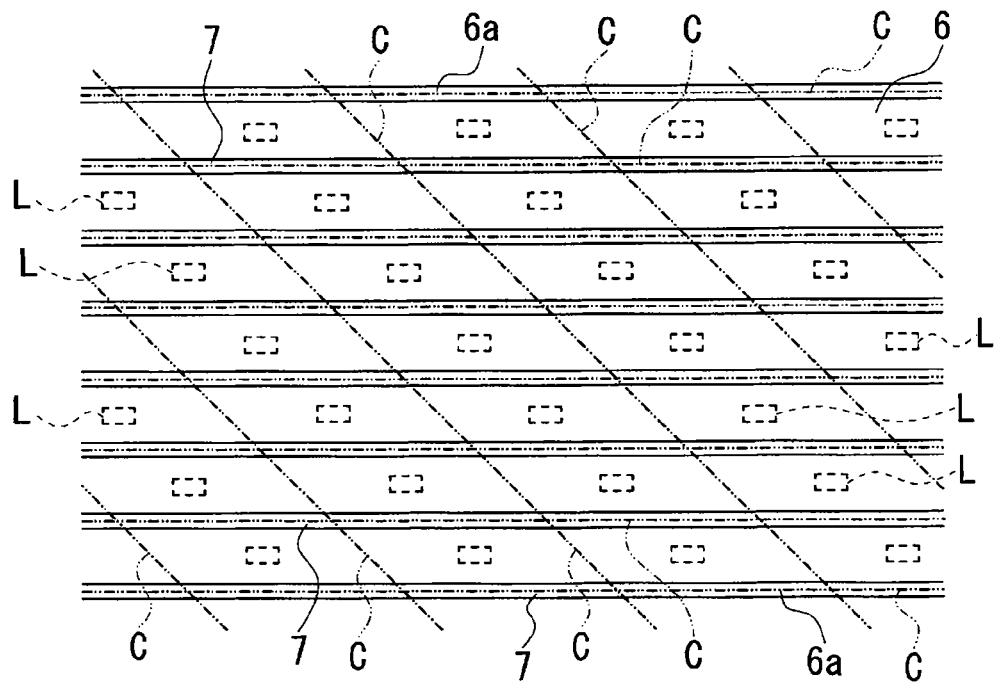
[Fig. 8]
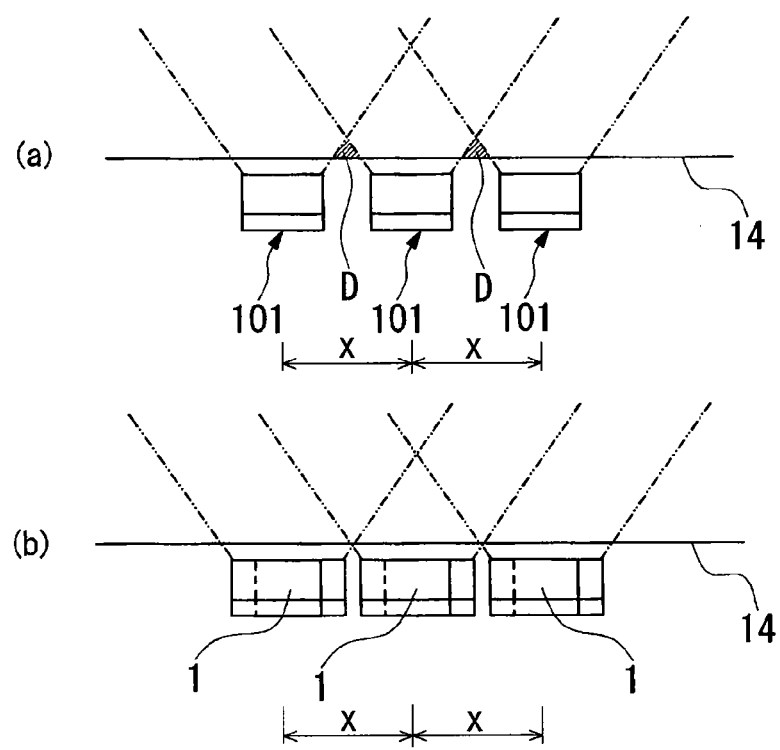

[Fig. 9]
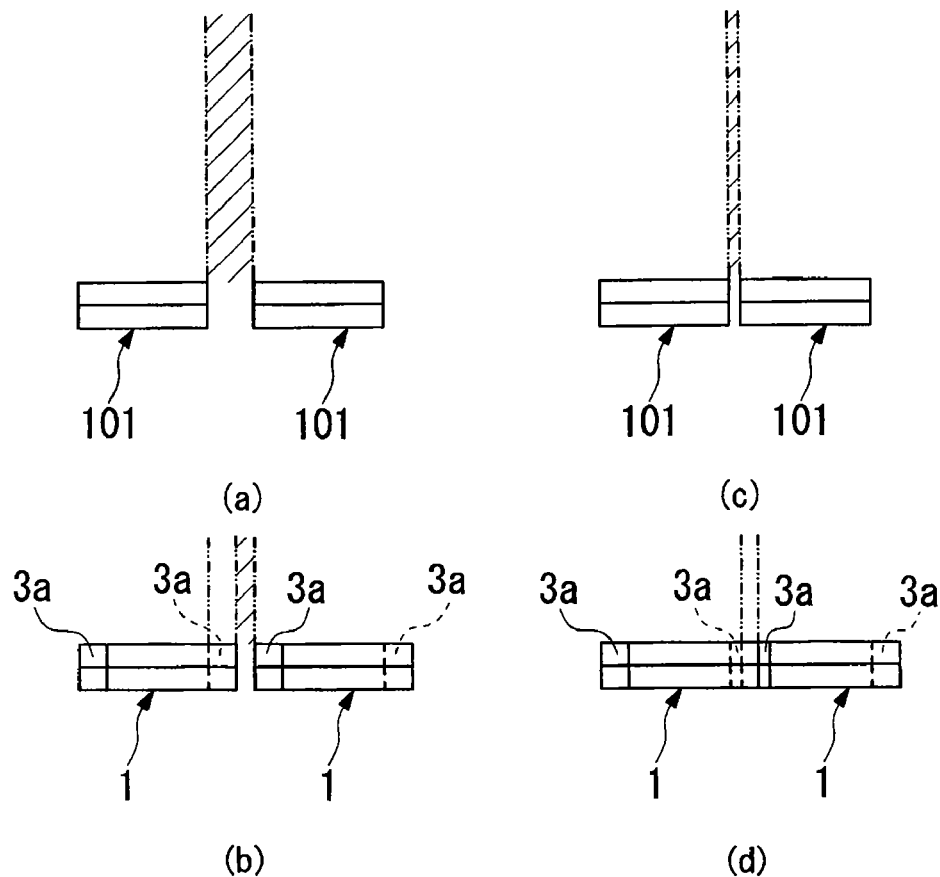
[Fig. 10]
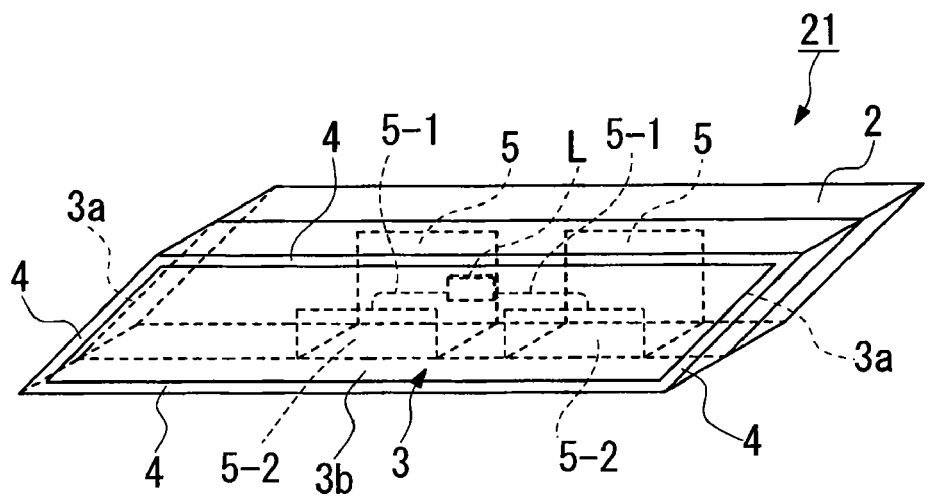

[Fig. 11]
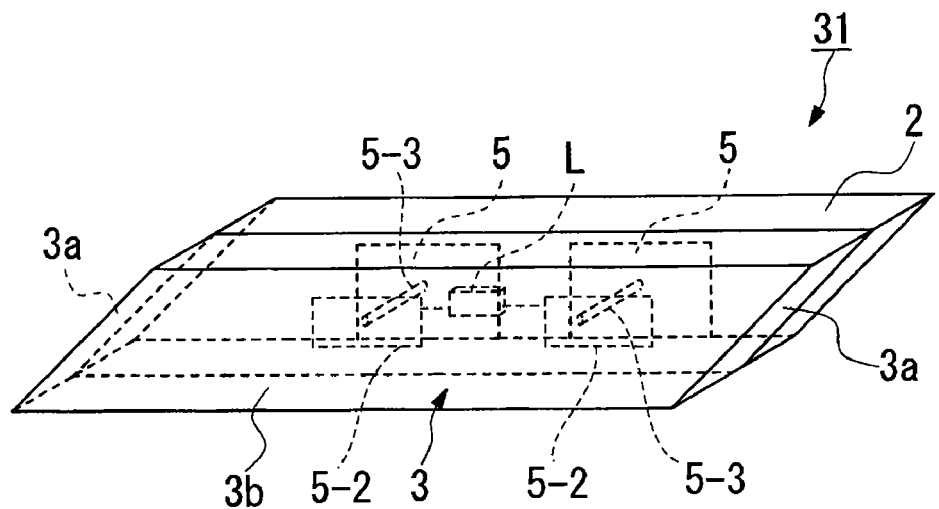
[Fig. 12]
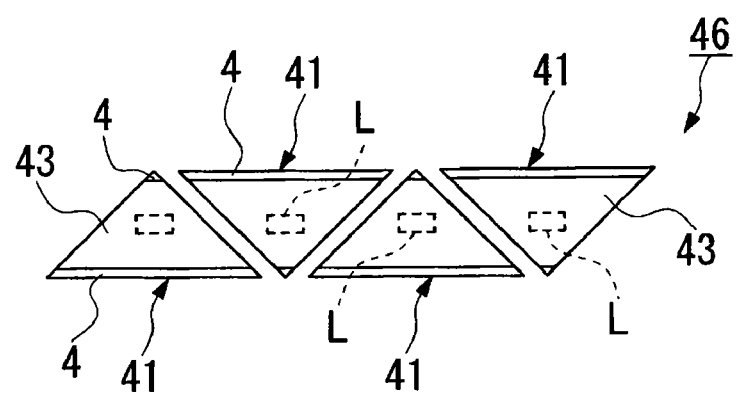
(a)
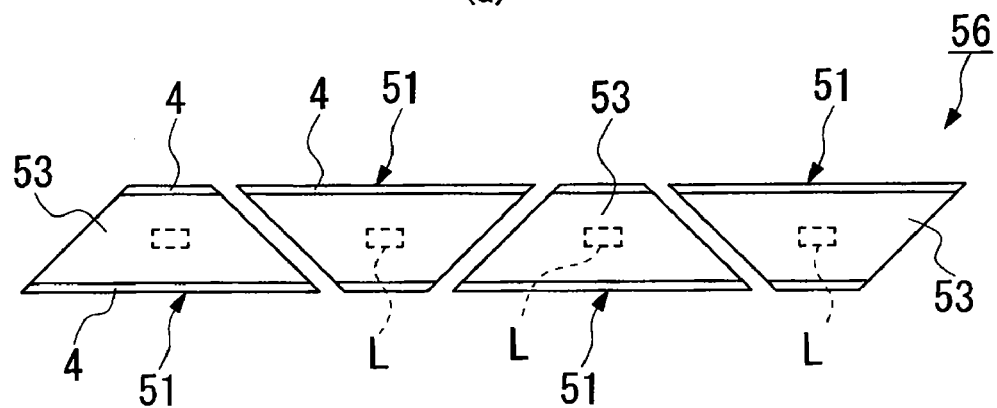
(b)

LIGHT-EMITTING DEVICE, LINEAR LIGHT SOURCE, PLANAR LIGHT UNIT AND DISPLAY APPARATUS

RELATED APPLICATION

This application claims priority under 35 U.S.C. §119 to Japanese Patent application No. JP2008-088856 filed on Mar. 28, 2008, the entire contents of which are hereby incorporated by reference.

1. Technical Field

The present invention relates to a light-emitting device, a linear light source and a planar light unit that are used to illuminate a liquid crystal display panel or used as lighting and illuminating devices. The present invention also relates to a display apparatus that uses such a light-emitting device, a linear light source and a planar light unit.

2. Related Art

Liquid crystal display apparatuses are widely used as displays of notebook personal computers (PCs), mobile PCs, mobile phones, personal digital assistants (PDAs), automatic teller machines (ATMs), etc. These liquid crystal display apparatuses employ a backlight unit that applies illuminating light to a liquid crystal display panel from the back thereof to enhance the luminance of the display screen.

One type of backlight unit has a lightguide plate and a light source comprising, for example, a plurality of light-emitting diodes (LEDs) disposed along one peripheral edge surface of the lightguide plate that serves as a light entrance surface. The lightguide plate receives light from the LED light source through the light entrance surface, guides the light therethrough and emits the guided light from a front surface thereof, which serves as a light exiting surface, toward a liquid crystal display panel. In this type of backlight unit, a plurality of LEDs are arrayed along the light entrance surface of the lightguide plate as a light source, as stated above. Accordingly, bright or dark lines may appear near the light entrance surface in correspondence to the array positions of the LEDs, resulting in a luminance unevenness on the light exiting surface.

To cope with the above-described problem, Japanese Patent Application Publication No. 2003-215346, for example, proposes providing irregularities on a light entrance surface of a lightguide plate that faces an LED light source to scatter light entering through the light entrance surface to improve the luminance unevenness near the light entrance surface of the lightguide plate. Japanese Patent Application Publication No. 2001-236811 uses a light source formed by attaching a plurality of LEDs to a transparent rod to emit a uniform linear light beam from the rod to the light entrance surface to attain a uniform luminance distribution.

SUMMARY OF THE INVENTION

With the above-described techniques, however, it is necessary to form irregularities on a light entrance surface of a lightguide plate or to construct a linear light source by attaching LEDs to a rod, which causes an increase in cost. In addition, there has recently been a demand for a higher luminance uniformity in accordance with the achievement of high-performance liquid crystal display apparatuses and the like.

The present invention has been made in view of the above-described problems with the background art. Accordingly, an object of the present invention is to provide a light-emitting device, a linear light source and a planar light unit that can enhance the luminance uniformity to improve the luminance unevenness and appearance without the need to use a special lightguide plate or an additional member. Another object of the present invention is to provide a display apparatus that uses such a light-emitting device, a linear light source and a planar light unit.

The present invention provides a light-emitting device used in a linear array of a plurality of them. The light-emitting device includes a semiconductor light-emitting element and a substrate having a front surface on which the semiconductor light-emitting element is mounted. The substrate further has a rear surface opposing the front surface and a peripheral edge surface including a plurality of side surfaces extending between the front and rear surfaces. The light-emitting device further includes a light-transmitting sealing resin formed on the front surface of the substrate to seal the semiconductor light-emitting element. The sealing resin has a light exiting surface opposed to the front surface of the substrate and a peripheral edge surface including a plurality of side surfaces extending between the front surface of the substrate and the light exiting surface. Of each of the peripheral edge surfaces of the substrate and the sealing resin, at least one side surface that faces in the direction of the array is inclined in the direction of the array.

In this light-emitting device, the inclined side surfaces of the mutually adjacent light-emitting devices are opposed close to each other. With this structure, when the light-emitting devices emit light, dark spots are unlikely to appear in regions corresponding to the areas between the mutually adjacent light-emitting devices, thereby making it possible to reduce the luminance unevenness on the light exiting surface of a lightguide plate that receives light from the light-emitting devices arrayed as stated above.

The substrate and the sealing resin may be formed in the shape of a parallelepiped. This structure makes it easy to array the light-emitting devices adjacent to each other with their inclined side surfaces opposed close to each other as stated above.

The light-emitting device may be arranged as follows. The front surface of the substrate is provided with a pair of internal electrodes that are electrically connected to the semiconductor light-emitting element, and the rear surface of the substrate is provided with a pair of external electrodes that are electrically connected to the pair of internal electrodes, respectively. The external electrodes are formed on a part of the rear surface of the substrate inward of the peripheral edge thereof, i.e. off the corners of the substrate that are formed by the rear surface, the side surfaces and the lower surface. With this structure, because the external electrodes are formed on the rear surface of the substrate, there is no need to provide a clearance for soldering, for example, between mutually adjacent light-emitting devices when the external electrodes of the light-emitting devices placed close to each other are bonded to a mounting substrate or the like by soldering. Accordingly, the light-emitting devices can be mounted as close to each other as possible. The external electrodes may have respective portions extending from the rear surface over the lower surface, which is a part of the peripheral edge surface of the substrate, to reach the internal electrodes. The external electrodes provided on the rear surface and the internal electrodes may be electrically connected through through-holes provided in the substrate. With this structure, the external electrodes are three-dimensionally formed to extend over the rear and lower surfaces of the substrate. Accordingly, it is possible to ensure the bond strength to a motherboard when the light-emitting devices are mounted thereon.

The peripheral edge surface of the substrate and the peripheral edge surface of the sealing resin are preferably flush with each other.

The sealing resin may have a reflecting layer formed on at least one side surface of the peripheral edge surface thereof to inwardly reflect light from the semiconductor light-emitting element. With this structure, it is possible to suppress the useless outward emission of light from the surfaces other than the light exiting surface and hence possible to enhance the luminous intensity on the light exiting surface.

The light exiting surface of the sealing resin may be parallelogram, triangular or trapezoidal in shape.

In addition, the present invention provides a linear light source including a plurality of the above-described light-emitting devices of the present invention. The light-emitting devices are arrayed linearly and close to each other with their light exiting surfaces disposed substantially parallel to the direction of the array and with their inclined side surfaces opposed close to each other. In this linear light source, the light-emitting devices of the present invention are arrayed with their inclined side surfaces opposed close to each other. Accordingly, when the light source emits light, dark spots are unlikely to appear in regions corresponding to the areas between the mutually adjacent light-emitting devices. Thus, it is possible to obtain a light source having a linearly uniform luminous intensity distribution.

In addition, the present invention provides a planar light unit including the above-described linear light source and a lightguide plate having a light exiting surface and a linear light entrance surface formed by a part of a peripheral edge surface extending from the periphery of the light exiting surface. The light entrance surface is disposed to face the linear light source. In this planar light unit, the above-described linear light source is used as a light source. Therefore, it is possible to reduce the luminance unevenness on the light exiting surface of the lightguide plate.

In addition, the present invention provides a display apparatus including an image display panel and the above-described planar light unit of the present invention, which is disposed at the front or back side of the image display panel. This display apparatus has the above-described planar light unit of the present invention and therefore can display an image with high luminance uniformity.

The display apparatus may be a liquid crystal display apparatus using a liquid crystal display panel as the above-described image display panel. Because of using a liquid crystal display panel, the display apparatus can be reduced in thickness, weight and cost, and liquid crystal display excellent in luminance uniformity can be obtained.

BRIEF DESCRIPTION OF THE DRAWINGS

FIG. 1 is a perspective view of a light-emitting device according to the present invention.

FIG. 2 is a diagram illustrating the light-emitting device shown in FIG. 1, of which: part (a) is a top view; part (b) is a front view; and part (c) is a bottom view.

FIG. 3 is a diagram illustrating the light-emitting device, of which: part (a) is a left-hand side view; part (b) is a right-hand side view; and part (c) is a rear view.

FIG. 4 is a diagram illustrating a planar light unit having a linear light source including a plurality of light-emitting devices linearly disposed or arrayed, and one of the light-emitting devices as shown in FIG. 1, of which: part (a) is a front view; part (b) is a rear view; and part (c) is a side view.

FIG. 5 is a top view of the planar light unit shown in FIG. 4.

FIG. 6 is a sectional view of a liquid crystal display apparatus having the planar light unit shown in FIG. 4.

FIG. 7 is a diagram illustrating a method of manufacturing a plurality of the light-emitting devices shown in FIG. 1.

FIG. 8 is a diagram showing arrangements of light-emitting devices, of which: part (a) shows an arrangement in which conventional light-emitting devices are linearly disposed or arrayed; and part (b) shows an arrangement in which a plurality of the light-emitting devices as shown in FIG. 1 are arrayed.

FIG. 9 is a diagram showing gaps between light-emitting devices, of which: part (a) shows a gap between a pair of mutually adjacent light-emitting devices in part (a) of FIG. 8; part (b) shows a gap between a pair of mutually adjacent light-emitting devices in part (b) of FIG. 8; part (c) shows an arrangement in which each pair of mutually adjacent light-emitting devices in part (a) of FIG. 8 are arranged with a narrowed gap therebetween; and part (d) shows an arrangement in which each pair of mutually adjacent light-emitting devices in part (b) of FIG. 8 are arranged with a narrowed gap therebetween.

FIG. 10 is a perspective view showing a second embodiment of the light-emitting device according to the present invention.

FIG. 11 is a perspective view showing a third embodiment of the light-emitting device according to the present invention.

FIGS. 12(*a*) and 12(*b*) are front views showing linear light sources respectively formed by linearly disposing light-emitting devices according to two other embodiments of the present invention.

DETAILED DESCRIPTION OF THE PREFERRED EMBODIMENTS

A first embodiment of the present invention will be explained below with reference to FIGS. 1 to 9. It should be noted that the scale of the figures used in the following explanation is properly changed to show each member in a recognizable size.

A light-emitting device 1 in this embodiment is as shown in FIGS. 1 to 3. In actual use, a plurality of light-emitting devices 1 are, as shown in FIGS. 4 and 5, linearly disposed with their side surfaces opposed close to each other. Each light-emitting device 1 has a substrate 2, a semiconductor light-emitting element L mounted on a front surface of the substrate 2, and a sealing resin 3 formed on the front surface of the substrate 2 to seal the semiconductor light-emitting element L.

The semiconductor light-emitting element L is an LED (light-emitting diode) element or LD (semiconductor laser) element that emits near ultraviolet light. The LED or LD element is formed, for example, by stacking a plurality of semiconductor layers of a gallium nitride compound semiconductor (e.g. InGaN compound semiconductor) on an insulating substrate, e.g. a sapphire substrate.

The semiconductor light-emitting element L is mounted on the center of the front surface of the substrate 2.

The sealing resin 3 is a light-transmitting resin, which is formed by adding, for example, a YAG fluorescent substance into a silicone resin as a main component. The YAG fluorescent substance converts blue or ultraviolet light from the semiconductor light-emitting element L into yellow light, and white light is produced by color mixing effect.

The sealing resin 3 is formed in the shape of a parallelepiped and has side surfaces 3*a* that are inclined in the above-described array direction in which a plurality of light-emitting devices 1 are arrayed with their side surfaces 3a opposed close to each other. It should be noted that the side surfaces 3a of the sealing resin 3 in this embodiment are inclined at an angle of 45° to the array direction. The substrate 2 is formed in the shape of a parallelepiped in conformity to the shape of the sealing resin 3. The adjoining side surfaces of the substrate 2 and the sealing resin 3 are flush with each other. In other words, the overall configuration of the light-emitting device 1 is a parallelepiped.

The upper and lower surfaces 3c, i.e., the outer surfaces of the sealing resin 3 except a light exiting surface 3b and side surfaces 3a are provided with respective reflecting layers 4 that inwardly reflect light in the sealing resin 3. The reflecting layers 4 are formed of a light-reflecting resin, e.g. a silicone resin or epoxy resin mixed with titanium oxide powder or a white pigment. It should be noted that if a light-reflecting resin used to form the reflecting layers 4 is of the same properties as those of the light-transmitting resin used to form the sealing resin 3 (e.g. a silicone resin), it is possible to obtain favorable mutual bondability and thermal properties, e.g. similar coefficients of thermal expansion.

The rear surface of the substrate 2 (i.e. surface opposite to the front surface provided with the semiconductor light-emitting element L) is provided with a pair of external electrodes 5 that are electrically connected to the semiconductor light-emitting element L. The external electrodes 5 have respective portions 5' extending on the lower surface of the substrate 2. The extending portions 5' are connected to internal electrodes 5-2 formed on the front surface of the substrate 2. The semiconductor light-emitting element L is mounted on and electrically connected to one of the internal electrodes 5-2. To the other internal electrode 5-2, the semiconductor light-emitting element L is electrically connected through a thin metal wire 5-1 formed by wire bonding.

A linear light source 6 shown in FIGS. 4 to 6 comprises a plurality of light-emitting devices 1 arrayed close to each other with their inclined side surfaces opposed close to each other. In the linear light source 6, the light-emitting devices 1 are linearly disposed or arrayed at a constant pitch on a mounting substrate or a motherboard (not shown). The external electrodes 5 of the light-emitting devices 1 are electrically mounted on the mounting substrate by soldering or the like.

FIGS. 5 and 6 show a liquid crystal display apparatus 13 used as a liquid crystal display of a notebook PC, a mobile PC, a mobile phone, a PDA, or an ATM, for example. The liquid crystal display apparatus 13 has a backlight unit (planar light unit) 12 using a linear light source 6 and a display panel 16 disposed to face the linear light source 6 at a front side or a rear side thereof. The backlight unit 12 has a lightguide plate 14, a diffusing sheet 15, first and second prism sheets 17A and 17B, and a reflecting sheet 18. The lightguide plate 14 receives light from the light-emitting devices 1 of the linear light source 6 through one side edge surface (light entrance surface) and guides the light therethrough. The diffusing sheet 15 is disposed over the lightguide plate 14 to diffuse light from the upper surface of the lightguide plate 14, i.e. the front surface (light exiting surface) thereof, and thus, the apparatus obtains a uniform luminous intensity distribution. The first and second prism sheets 17A and 17B are disposed over the diffusing sheet 15 to direct light from the diffusing sheet 15 toward a liquid crystal display panel (image display panel) 16 as upward illuminating light. The reflecting sheet 18 is disposed to face the lower surface of the lightguide plate 14. The diffusing sheet 15 may be a sheet made of a transparent resin, e.g. an acrylic or polycarbonate resin, having silica particles or the like dispersed therein.

The lightguide plate 14 is secured to a holder (not shown) that supports the diffusing sheet 15 and the other sheet members, by using double-coated adhesive tape, for example.

The first prism sheet 17A is disposed over the diffusing sheet 15. The second prism sheet 17B is disposed over the first prism sheet 17A. The first and second prism sheets 17A and 17B each have a multiplicity of mutually parallel prisms provided on their upper surfaces. The prisms extend in a direction perpendicular to the optical axis of light from the light-emitting devices 1 to direct light from the diffusing sheet 15 upward toward the liquid crystal display panel 16. To obtain high directivity in the upward direction, the first and second prism sheets 17A and 17B are disposed so that their respective prisms perpendicularly intersect each other in plan view.

The reflecting sheet 18 is a metal plate, film, foil or the like having a light-reflecting function. In this embodiment, the reflecting sheet 18 is a film provided with an evaporated silver layer. It should be noted, however, that an evaporated aluminum layer or the like may be used in place of the evaporated silver layer. The reflecting sheet 18 is bonded, for example, to a holder (not shown) that houses the above-described sheets of the backlight unit 12.

The liquid crystal display panel 16 is a transmissive or semitransmissive liquid crystal display panel. In the case of a transmissive liquid crystal display panel 16, for example, it has a panel body having a liquid crystal material, e.g. TN liquid crystal or STN liquid crystal, sealed with a sealant in a gap between an upper substrate and a lower substrate, each having a transparent electrode layer, an alignment film and a polarizer.

Next, a method of manufacturing the above-described light-emitting devices 1 will be explained with reference to FIG. 7.

First, a substrate base material as an assembly of substrates 2 may be provided with electrodes on front and rear surfaces of the substrate base material. Next, as shown in FIG. 7, a multiplicity of semiconductor light-emitting elements L are arrayed and mounted on the substrate base material. After the light-emitting elements L are electrically connected to associated electrodes on the front surface of the substrate base material through wires or bumps, a light-transmitting resin layer 6 is formed over the substrate base material to form a sealing resin 3 that covers each light-emitting device on each front surface of the substrates. Next, only the light-transmitting resin layer 6 is diced with a blade, with the substrate base material left uncut, to form grooves 6a.

A light-reflecting resin 7 serving as reflecting layers 4 is filled in the grooves 6a and set therein. Next, the stack of the light-transmitting resin layer 6, the light-reflecting resin 7 and the substrate base material is cut along cutting lines C into individual light-emitting devices 1 each having a parallelepiped configuration as a whole. It should be noted that external electrodes 5 on the side surfaces of the substrates 2 of the light-emitting devices 1 may be formed after separating them from each other. In this way, a multiplicity of light-emitting devices 1 can be produced simultaneously.

FIG. 8 shows arrangements of light-emitting devices linearly disposed along the light entrance surface of the lightguide plate 14. Part (a) of FIG. 8 shows an arrangement in which conventional rectangular parallelepiped light-emitting devices 101 are linearly disposed at a pitch x. Part (b) of FIG. 8 shows an arrangement in which light-emitting devices 1 of this embodiment are linearly disposed at the same pitch x. As will be clear from FIG. 8, the light-emitting devices 1 of this embodiment are each inclined at the side surfaces 3a of the sealing resin 3, and hence, the width of the light exiting surface 3b facing the light entrance surface of the lightguide plate 14 is longer than the light exiting surface of the rectangular parallelepiped light-emitting device 101. Consequently, the gap between each pair of mutually adjacent light-emitting devices is shorter than in the conventional structure (see parts (a) and (b) of FIG. 9). Accordingly, it is possible to prevent the occurrence of dark spots D as shown in part (a) of FIG. 8. More specifically, when the conventional rectangular parallelepiped light-emitting devices 101 are linearly disposed as shown in part (a) of FIG. 8, dark spots D may appear near the light entrance surface of the lightguide plate. With the light-emitting devices 1 according to this embodiment, the occurrence of such dark spots D can be prevented as shown in part (b) of FIG. 8.

When the array pitch of the conventional light-emitting devices 101 is shortened, as shown in part (c) of FIG. 9, there is still a gap between the mutually adjacent light-emitting devices 101 although it is narrow. With the light-emitting devices 1 of this embodiment, as shown in part (d) of FIG. 9, there is no gap because the side portions of the substrate 2 and the sealing resin 3 of one of the mutually adjacent light-emitting devices 1 overlap those of the other light-emitting device 1 in plan view. Accordingly, the luminance unevenness can be reduced even more effectively.

Thus, in this embodiment, a bright-dark difference and bright or dark lines are unlikely to appear between the mutually adjacent light-emitting devices 1. Accordingly, the luminance unevenness can be reduced, and the appearance can be improved.

Further, because the external electrodes 5 are formed around the center of the rear surface and/or the lower surface of the substrate 2, there is no need to provide a clearance for soldering, for example, between mutually adjacent light-emitting devices 1 when the external electrodes 5 of the light-emitting devices 1 placed close to each other are bonded to a mounting substrate or the like by soldering. Accordingly, the light-emitting devices 1 can be mounted as close to each other as possible.

Further, the upper and lower surfaces 3c of the sealing resin 3 are provided with respective reflecting layers 4 that inwardly reflect light in the sealing resin 3. Therefore, it is possible to suppress the useless outward emission of light from the surfaces other than the light exiting surface and hence possible to enhance the luminous intensity in the forward direction of the light exiting surface 3b.

The following is an explanation of a second embodiment (FIG. 10) and a third embodiment (FIG. 11) of the light-emitting device according to the present invention. In the following explanation, the same constituent elements as those in the foregoing first embodiment are denoted by the same reference numerals as used in the first embodiment, and a description thereof is omitted herein.

The light-emitting device 21 of the second embodiment differs from the light-emitting device 1 of the first embodiment as follows. In the light-emitting device 1, reflecting layers 4 are provided on the upper and lower surfaces 3c of the sealing resin 3, whereas, in the light-emitting device 21, reflecting layers 4 are provided on all the outer peripheral surfaces of the sealing resin 3 except the light exiting surface 3b to enhance the luminous intensity in the forward direction of the light exiting surface 3b. In this embodiment, internal electrodes 5-2 are provided to extend on the front surface of the substrate 2 to the extending portions 5' of the external electrodes 5. The semiconductor light-emitting element L is electrically connected to the internal electrodes 5-2 and the external electrodes 5.

The light-emitting device 31 of the third embodiment differs from the light-emitting device 1 of the first embodiment in that all the outer peripheral surfaces of the sealing resin 3 are exposed with no reflecting layer 4 provided, and thus, the light-emitting device 31 can be manufactured with a reduced production cost. In this embodiment, internal electrodes 5-2 are provided on the front surface of the substrate 2, where the semiconductor light-emitting element L is provided, in correspondence to external electrodes 5 and electrically connected to the external electrodes 5 through vias 5-3. The semiconductor light-emitting element L is electrically connected to the internal electrodes 5-2 and the external electrodes 5.

It should be noted that the present invention is not necessarily limited to the foregoing embodiments but can be modified in a variety of ways without departing from the scope of the present invention.

For example, in the foregoing embodiments, the side surfaces of the light-emitting device (i.e. the side surfaces of the substrate and the side surfaces of the sealing resin) are inclined at an angle of 45°. The inclination angle of the side surfaces, however, may be set arbitrarily. The height and width of the light-emitting device may be properly set according to the mounting space, the number of semiconductor light-emitting elements to be mounted and the luminous intensity.

The above-described light-emitting device and linear light source are suitable for use in a backlight unit as stated above, but may also be employed in other use applications, for example, interior lighting and illumination.

Although the above-described light-emitting devices have a parallelepiped overall configuration (i.e. the outer shape of the stack of the substrate and the sealing resin), other configurations may be adopted, provided that the adjoining side surfaces are inclined in the above-described array direction. For example, as shown in parts (a) and (b) of FIG. 12, light-emitting devices 41 and 51 may have triangular or trapezoidal prism-shaped substrates (not shown) and sealing resins 43 and 45, respectively, and these light-emitting devices 41 and 51 may be arrayed to form linear light sources 46 and 56, respectively. It should be noted that, when arrayed, the light-emitting devices 41 or 51 are alternately turned upside down, and the position of the electrodes thereof correspondingly changes between the upper and lower sides. Consequently, two mounting substrates are needed for the upper and lower sides, respectively. In this regard, the parallelepiped light-emitting devices are preferable because they require a mounting substrate or a motherboard only for the lower side.

Although the foregoing embodiments use light-emitting devices comprising white LEDs, the light-emitting devices may be arranged to emit other colors of light. For example, a plurality of semiconductor light-emitting elements that emit three primary colors of light, respectively, may be mounted to emit various colors of light arbitrarily.

Although a diffusing sheet is used in the backlight units of the foregoing embodiments, the diffusing sheet may be omitted. Although two prism sheets are used in the foregoing embodiments, the backlight unit may have only one prism sheet.

Although the display apparatuses of the foregoing embodiments employ a liquid crystal display panel as an image display panel, other types of image display panels may be used, for example, an electronic paper. In this case, the planar light unit of the present invention is installed as a front light unit at the front side of the electronic paper body.

The invention claimed is:

1. A light-emitting device used in a linear array of a plurality of the light-emitting devices, the light-emitting device comprising:
   a semiconductor light-emitting element;
   a substrate having a front surface on which the semiconductor light-emitting element is mounted, a rear surface opposing the front surface, and a peripheral edge surface including a plurality of side surfaces extending between the front surface and the rear surface; and
   a light-transmitting sealing resin formed on the front surface of the substrate to seal the semiconductor light-emitting element, the sealing resin having a light exiting surface opposed to the front surface of the substrate and a peripheral edge surface including a plurality of side surfaces extending between the front surface of the substrate and the light exiting surface,
   wherein, of each of the peripheral edge surface of the substrate and the peripheral edge surface of the sealing resin, at least one side surface that faces in a direction of the array is inclined in the direction of the array,
   wherein the substrate and the sealing resin are in a shape of a parallelepiped.

2. The light-emitting device of claim 1, wherein the front surface of the substrate is provided with a pair of internal electrodes that are electrically connected to the semiconductor light-emitting element, and the rear surface of the substrate is provided with a pair of external electrodes that are electrically connected to the pair of internal electrodes, respectively.

3. The light-emitting device of claim 1, wherein the sealing resin has a reflecting layer formed on at least one side surface of the peripheral edge surface thereof to inwardly reflect light from the semiconductor light-emitting element.

4. The light-emitting device of claim 2, wherein the pair of external electrodes have respective portions extending on a part of the peripheral edge surface of the substrate to reach the internal electrodes.

5. The light-emitting device of claim 1, wherein the peripheral edge surface of the substrate and the peripheral edge surface of the sealing resin are flush with each other.

6. The light-emitting device of claim 1, wherein the light exiting surface of the sealing resin is parallelogram in shape.

7. A light-emitting device used in a linear array of a plurality of the light-emitting devices, the light-emitting device comprising:
   a semiconductor light-emitting element;
   a substrate having a front surface on which the semiconductor light-emitting element is mounted, a rear surface opposing the front surface, and a peripheral edge surface including a plurality of side surfaces extending between the front surface and the rear surface; and
   a light-transmitting sealing resin formed on the front surface of the substrate to seal the semiconductor light-emitting element, the sealing resin having a light exiting surface opposed to the front surface of the substrate and a peripheral edge surface including a plurality of side surfaces extending between the front surface of the substrate and the light exiting surface,
   wherein, of each of the peripheral edge surface of the substrate and the peripheral edge surface of the sealing resin, at least one side surface that faces in a direction of the array is inclined in the direction of the array,
   wherein the light exiting surface of the sealing resin is triangular in shape.

8. A light-emitting device used in a linear array of a plurality of the light-emitting devices, the light-emitting device comprising:
   a semiconductor light-emitting element;
   a substrate having a front surface on which the semiconductor light-emitting element is mounted, a rear surface opposing the front surface, and a peripheral edge surface including a plurality of side surfaces extending between the front surface and the rear surface; and
   a light-transmitting sealing resin formed on the front surface of the substrate to seal the semiconductor light-emitting element, the sealing resin having a light exiting surface opposed to the front surface of the substrate and a peripheral edge surface including a plurality of side surfaces extending between the front surface of the substrate and the light exiting surface,
   wherein, of each of the peripheral edge surface of the substrate and the peripheral edge surface of the sealing resin, at least one side surface that faces in a direction of the array is inclined in the direction of the array,
   wherein the light exiting surface of the sealing resin is trapezoidal in shape.

9. The light-emitting device of claim 1, wherein the sealing resin has a reflecting layer formed on the peripheral edge surface of the sealing resin except the inclined side surface.

10. A linear light source comprising:
    a plurality of the light-emitting devices of claim 1, the light-emitting devices being arrayed and close to each other with their light exiting surfaces disposed substantially parallel to the direction of the array and with their inclined side surfaces opposed and close to each other.

11. A linear light source comprising:
    a plurality of the light-emitting devices of claim 6;
    the light-emitting devices being arrayed and close to each other with their light exiting surfaces disposed substantially parallel to the direction of the array and with their inclined side surfaces opposed and close to each other.

12. A linear light source comprising:
    a plurality of the light-emitting devices of claim 7;
    the light-emitting devices being arrayed and close to each other with their light exiting surfaces disposed substantially parallel to the direction of the array and with their inclined side surfaces opposed and close to each other.

13. A linear light source comprising:
    a plurality of the light-emitting devices of claim 8;
    the light-emitting devices being arrayed and close to each other with their light exiting surfaces disposed substantially parallel to the direction of the array and with their inclined side surfaces opposed and close to each other.

14. A planar light unit comprising:
the linear light source of claim 10; and
a lightguide plate having a linear light entrance surface disposed to face the light exiting surfaces of the plurality of light-emitting devices constituting the linear light source.

15. A planar light unit comprising:
the linear light source of claim 11; and
a lightguide plate having a linear light entrance surface disposed to face the light exiting surfaces of the plurality of light-emitting devices constituting the linear light source.

16. A planar light unit comprising:
the linear light source of claim 12; and
a lightguide plate having a linear light entrance surface disposed to face the light exiting surfaces of the plurality of light-emitting devices constituting the linear light source.

17. A planar light unit comprising:
the linear light source of claim 13; and
a lightguide plate having a linear light entrance surface disposed to face the light exiting surfaces of the plurality of light-emitting devices constituting the linear light source.

18. A display apparatus comprising:
an image display panel; and
the planar light unit of claim 14, which is disposed at either one of front and rear sides of the image display panel.

19. A display apparatus comprising:
an image display panel; and
the planar light unit of claim 15, which is disposed at either one of front and rear sides of the image display panel.

* * * * *